Dec. 6, 1966   W. H. MILLER   3,289,373
WEDGE SHAPED ANCHOR DEVICE
Filed April 20, 1964   2 Sheets-Sheet 1
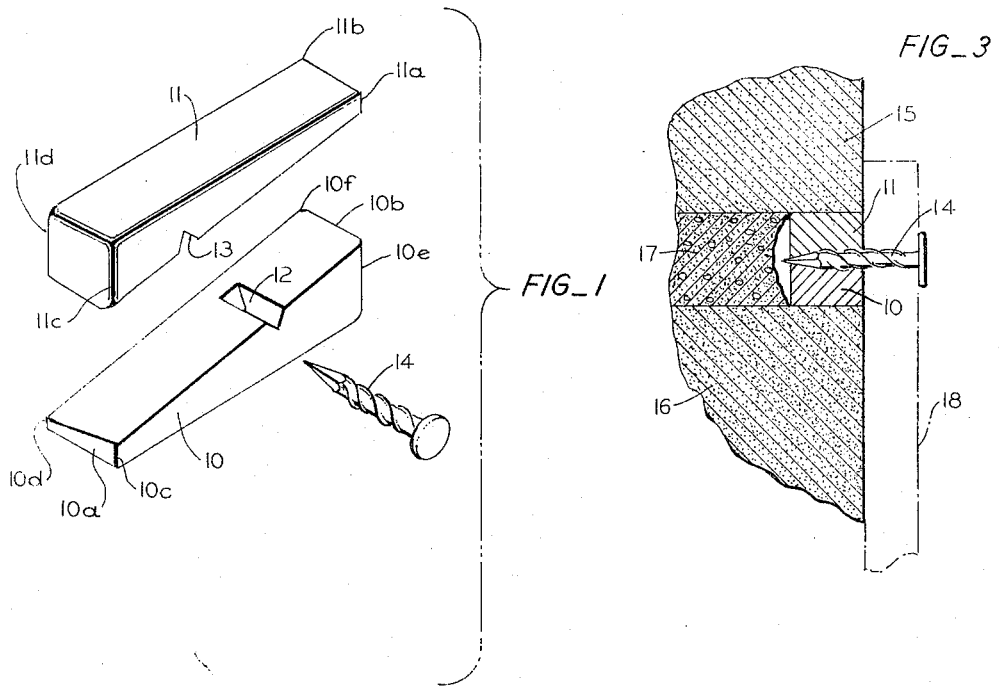
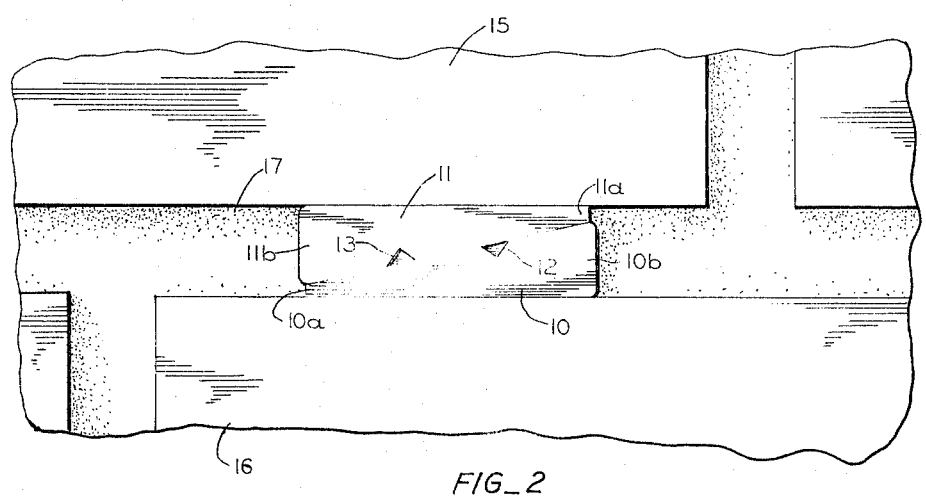
INVENTOR.
WILLIAM HOWARD MILLER
BY
Allen and Chromy
ATTORNEYS Dec. 6, 1966 W. H. MILLER 3,289,373
WEDGE SHAPED ANCHOR DEVICE
Filed April 20, 1964 2 Sheets-Sheet 2
FIG_4
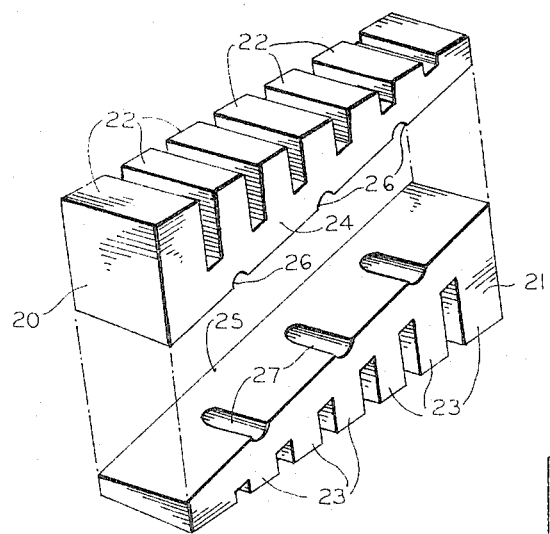
FIG_5
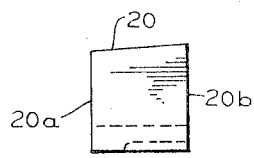
FIG_6
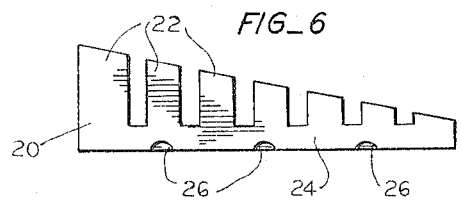
FIG_7
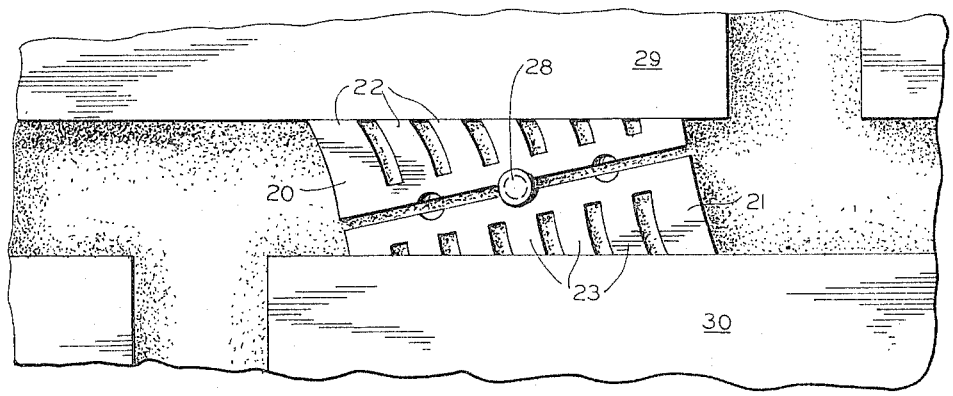
FIG_8
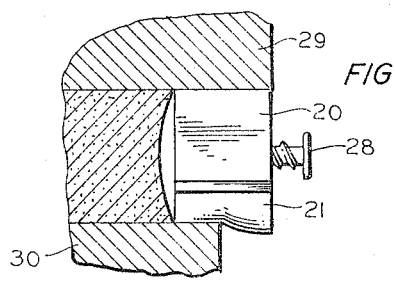
INVENTOR.
WILLIAM HOWARD MILLER
BY
*Allen and Chromy*
ATTORNEYS.

United States Patent Office 3,289,373
Patented Dec. 6, 1966

3,289,373
WEDGE SHAPED ANCHOR DEVICE
William Howard Miller, 1523 Altamont Ave.,
San Jose, Calif.
Filed Apr. 20, 1964, Ser. No. 365,229
3 Claims. (Cl. 52—375)

This application is a continuation-in-part of my application Serial No. 278,229, filed May 6, 1963, and now abandoned.

This invention relates to a wedge anchor device adapted to support articles on brick or block walls.

An object of this invention is to provide an improved article supporting device that is adapted to fit into the recess in front of a mortar joint of brick or block wall.

Another object of this invention is to provide an improved article supporting device that is made up of opposed wedges which are frictionally wedged into the recess along a mortar joint of a brick or block wall and which are adapted to receive an article supporting pin which may be a screw or screw nail that is driven between said wedge members.

Still another object of this invention is to provide an improved article supporting device for use on brick or block walls, said device comprising a pair of wedge members which are adapted to fit into the recess of a mortar joint of the wall; the joint between said wedge members being adapted to receive a nail or screw for supporting the article, said wedge members being tapered in their transverse direction as well as in their lengthwise direction so that they lock each other in the mortar joint when the nail or screw is driven therebetween.

Still another object of this invention is to provide an improved article supporting device that is made up of opposed wedges which are provided with serrated or grooved surfaces having a plurality of resilient finger-like members that are frictionally wedged against opposed surfaces of the brick or block in a recess along a mortar joint.

Other and further objects of this invention will be apparent to those skilled in the art to which it relates from the following specification, claims and drawing in which, briefly:

FIG. 1 is an exploded view showing the wedge members and nail spaced apart prior to assembly in the wall;

FIG. 2 is a front view of the wedge members of this invention assembled in the mortar joint of a brick wall;

FIG. 3 is a sectional view taken across the wedge members and the brick wall showing the members positioned in the recess of the mortar joint of the wall and also showing an article supporting nail driven into the joint between said members;

FIG. 4 is an exploded view showing the wedge members, each having a series of slightly resilient gripping fingers, prior to assembly in a wall;

FIG. 5 is an end view of one of the wedge members;

FIG. 6 is a side view of one of the wedge members;

FIG. 7 is a front view of the resilient wedge members of this invention assembled in the mortar joint recess of a brick wall showing the fingers of the wedge members slightly bent when they are pressed against the surfaces of the blocks or bricks on opposite sides of a masonary joint; and FIG. 8 is a fragmentary side view of a wall showing how the wedges of this invention firmly grip even in a shallow mortar joint recess.

Referring to the drawing in detail, reference numerals 10 and 11 designate a pair of wedge shaped members that are made of malleable material such as lead or lead alloys, or they may be made of suitable yieldable material such as wood, plastic, rubber or the like. Different materials may be selected depending upon the load that is to be supported by the nail or screw 14 that is driven into the joint between these members. The wedge-shaped member 10 is provided with a transverse recess 12 that extends part way across this member although it may of course extend across the entire width of the member if desired. A similar recess 13 is provided to the wedge-shaped members 11.

These wedge-shaped members 10 and 11 are made of the same configuration and thus may be interchanged. Also these wedges are made so that they are tapered transversely. Thus the dimension at the corner 10c of wedge 10 is greater than the thickness at the corner 10d and the thickness at the corner 10e is greater than the thickness at the corner 10f. Likewise, the thickness of the corner 11b of wedge 11 is greater than that at the corner 11a and the thickness at corner 11d is greater than the thickness at corner 11c. Consequently, when the wedge members 10 and 11 are assembled into the recess in front of the mortar joint 17 between the bricks or blocks 15 and 16, and the nail 14 is driven into one or both of the recesses 12 and 13, these wedge members are tightly wedged into the joint recess by the transverse wedging action as well as by the wedging action along the lengths of the members.

The nail receiving holes 12 and 13 of the wedge members may or may not line up so that they oppose each other as this is not necessary since the article supporting pin or nail 14 may be driven into either one of the holes. Various forms of article supporting pins may be employed such as conventional wood screws, self threading screws, nails provided with twisted flutes or grooves or conventional nails depending upon the material out of which the wedge members 10 and 11 are made.

Another embodiment of this invention is shown in FIG. 4 in which the wedges 20 and 21, which are similar to the wedge members 10 and 11, shown in FIG. 1, are made of resilient plastic material that does not have appreciable cold flow, such as butyrate, Lexan, high impact styrene, or the like. Other resilient plastic materials or plastic-impregnated materials may be employed, if desired, and the material used may depend upon the weight of the load to be supported, temperature, etc. The wedges 20 and 21 are each serrated or grooved transversely thereof to provide resilient fingers 22 and 23, respectively, thereto. These fingers are of gradually decreasing length, as shown, and the roots thereof are joined to the back portions 24 and 25, respectively, of the wedges. These back portions are provided with grooves or recesses 26 and 27, respectively, which extend part-way across these back portions so that suitable supporting pins, such as conventional wood screws, self-threading screws, or nails may be driven into these recesses after the wedges 20 and 21 are assembled in the mortar joint of the wall, as shown in FIG. 7. The inner dimensions 20a of the wedges may be made slightly less than the forward dimensions 20b as shown in FIG. 5. The inner surface of the wedge is placed adjacent to the mortar of the joint between the bricks or blocks 29 and 30 when the wedges are assembled in the wall. Thereafter, when the nail or pin 28 is driven between the wedges 20 and 21, the fingers 22 and 23 of the wedges 20 and 21, respectively, are slightly bent, and the outer surfaces of these fingers are brought into firm and positive gripping relation with the bricks or blocks 29 and 30, respectively, such that the pin 28 may be used to support relatively heavy objects weighing, for example, around 50 pounds on the outer face of the brick or block wall, such as is used for facing fireplaces and the like. The recesses 26 and 27 of the wedges need not be aligned when the wedges are inserted into the recess of the mortar joint because the pin 28 may be driven into either one of the recesses independently of the other. Also the mortar joint recess need not be as deep as the width of the wedges because a firm grip on surfaces of the bricks or blocks is obtained by this device even in a shallow recess as shown in FIG. 8.

While I have shown a preferred embodiment of the invention, it will be understood that the invention is capable of variation and modification from the form shown so that its scope should be limited only by the scope of the claims appended hereto.

What I claim is:

1. In a device for firmly fixing pins and the like for supporting articles on walls made of brick or blocks joined with mortar so that the joints are slightly recessed the combination comprising a pair of wedge members positioned in overlapping relation in a recessed joint in the wall so that the adjacent overlapping sides of said wedge members define an inclined joint therebetween the opposed surfaces of said inclined joint having pin receiving recesses therein extending at least part way across said wedge members, an article supporting pin frictionally held by said members in at least one of said pin receiving recesses, each of said wedge members having a plurality of fingers engaging opposing surfaces of the wall recess under pressure when said pin is driven between said members so that said pin and said members are firmly held in the selected mortar joint of the wall and an article may be supported in the wall thereby.

2. In a device for firmly fixing nails and the like for supporting articles on walls made of brick or blocks joined with mortar so that the points are slightly recessed the combination comprising a pair of wedge members of malleable material positioned in overlapping relation with a recessed joint in the wall so that the adjacent overlapping sides of said wedge members define an inclined joint therebetween, the opposed surfaces of said inclined joint having nail receiving recesses therein extending at least part way across said wedge members, a screw type nail in at least one of said nail receiving recesses, each of said wedge members having a plurality of fingers yieldably engaging opposing surfaces of the wall recess under pressure when said nail is driven between said members so that said nail is firmly held on the wall and an article may be supported on the wall thereby.

3. In a device for firmly fixing nails and the like for supporting articles on walls made of brick or blocks joined with mortar so that the joints are slightly recessed the combination comprising a pair of wedge members positioned in overlapping relation in a recessed joint in the wall so that the adjacent overlapping sides of said wedge members define an inclined joint therebetween, the opposed surfaces of said inclined joint having nail receiving recesses therein extending at least part way across said wedge members, a screw type nail frictionally held in at least one of said nail receiving recesses, each of said wedge members having a plurality of fingers engaging opposing surfaces of the wall recess under pressure when said nail is driven detween said members so that said nail is firmly held on the wall and an article may be supported on the wall thereby, said wedge members being oppositely tapered in their transverse direction so that they interlock when they are wedged into the recess of the wall.

References Cited by the Examiner

UNITED STATES PATENTS

| 1,485,202 | 2/1924 | Rosenberg | 85—44 |
| 1,486,935 | 3/1924 | Swanson et al. | 52—375 |
| 1,570,226 | 1/1926 | Bosco | 52—122 |
| 1,938,161 | 12/1933 | Whitacre | 52—375 |
| 2,066,718 | 1/1937 | Dietz | 52—122 |
| 2,192,048 | 2/1940 | Mueller | 287—127 |
| 3,185,442 | 5/1965 | Hemphill | 254—104 |

FOREIGN PATENTS 43,505 4/1934 France.
(1st addition to No. 749,691)

FRANK L. ABBOTT, *Primary Examiner.*

J. L. RIDGILL, *Assistant Examiner.*